(12) United States Patent
Debnath et al.

(10) Patent No.: US 11,245,607 B2
(45) Date of Patent: Feb. 8, 2022

(54) DYNAMIC DATA MOVEMENT BETWEEN CLOUD AND ON-PREMISE STORAGES

(71) Applicant: VMWARE, INC., Palo Alto, CA (US)

(72) Inventors: Sajal Debnath, Bangalore (IN); Prasanna Shetty, Bangalore (IN); Nitin Mishrauliya, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 140 days.

(21) Appl. No.: 15/899,377

(22) Filed: Feb. 20, 2018

(65) Prior Publication Data

US 2019/0182137 A1 Jun. 13, 2019

(30) Foreign Application Priority Data

Dec. 7, 2017 (IN) .............................. 201741043855

(51) Int. Cl.
| | | |
|---|---|---|
| *G06F 15/173* | (2006.01) | |
| *H04L 12/26* | (2006.01) | |
| *H04L 29/08* | (2006.01) | |
| *G06F 16/182* | (2019.01) | |
| *G06F 16/185* | (2019.01) | |

(52) U.S. Cl.
CPC ........ *H04L 43/0876* (2013.01); *G06F 16/182* (2019.01); *G06F 16/185* (2019.01); *H04L 43/16* (2013.01); *H04L 67/06* (2013.01); *H04L 67/1097* (2013.01)

(58) Field of Classification Search
CPC .... G06F 3/0608; G06F 3/067; G06F 9/45533; G06F 16/185; G06F 11/1453; G06F 16/13; G06F 16/27; G06F 16/162; G06F 16/1453; G06F 16/1748; G06F 16/119; G06F 16/214; G06F 16/182; G06F 3/04842; G06F 16/113; G06F 16/1824; G06F 16/9574; G06F 21/6218; G06Q 10/10; H04L 69/04; H04L 67/02; H04L 67/1097

See application file for complete search history.

(56) References Cited

U.S. PATENT DOCUMENTS

| | | | |
|---|---|---|---|
| 8,639,781 B1 * | 1/2014 | Motes | H04L 67/02 709/219 |
| 9,940,203 B1 * | 4/2018 | Ghatnekar | G06F 16/13 |
| 10,742,720 B2 * | 8/2020 | Masson | H04L 67/1097 |

(Continued)

*Primary Examiner* — Dustin Nguyen
(74) *Attorney, Agent, or Firm* — Patterson + Sheridan, LLP (57) ABSTRACT

The disclosure provides an approach for transferring files to cloud storage so as to reduce usage of on-premise storage units, and for dynamically reading ahead from cloud storage to improve read performance. In one embodiment, each storage unit in an on-premise storage system is considered independently, and a decision made to move files from a storage unit to cloud storage when utilization of that storage unit reaches an associated mid-water-mark. In particular, files may be transferred beginning with least-recently accessed and smallest files and proceeding until utilization percentage of the on-premise storage unit decreases to an associated low-water-mark. In addition, while files are being transferred to cloud storage, additional files may be written to the on-premise storage unit until an associated high-water-mark is touched, at which point any further writes are redirected to the cloud storage until usage of the on-premise storage unit is reduced to the low-water-mark or more.

20 Claims, 5 Drawing Sheets

(56) References Cited

U.S. PATENT DOCUMENTS

| | | | |
|---|---|---|---|
| 2003/0110190 A1* | 6/2003 | Achiwa | G06F 16/185 |
| 2003/0195940 A1* | 10/2003 | Basu | G06F 16/9574 709/213 |
| 2008/0126437 A1* | 5/2008 | Chiba | G06F 16/119 |
| 2011/0161291 A1* | 6/2011 | Taleck | G06F 11/1453 707/622 |
| 2011/0307573 A1* | 12/2011 | Lingafelt | G06Q 10/10 709/217 |
| 2012/0278371 A1* | 11/2012 | Montalvo | G06F 16/1748 707/827 |
| 2013/0024421 A1* | 1/2013 | Shinohara | G06F 3/0608 707/622 |
| 2013/0305039 A1* | 11/2013 | Gauda | G06F 21/6218 713/153 |
| 2014/0006357 A1* | 1/2014 | Davis | G06F 16/182 707/667 |
| 2014/0089449 A1* | 3/2014 | Bhogal | H04L 67/1097 709/213 |
| 2014/0181294 A1* | 6/2014 | Deshpande | G06F 9/45533 709/224 |
| 2014/0195572 A1* | 7/2014 | Okita | G06F 16/1824 707/827 |
| 2014/0297586 A1* | 10/2014 | Kim | G06F 16/162 707/610 |
| 2015/0373116 A1* | 12/2015 | Mo | G06F 3/0608 709/219 |
| 2016/0070766 A1* | 3/2016 | Kathpal | G06F 16/113 707/602 |
| 2016/0192178 A1* | 6/2016 | Blong | G06F 3/067 455/418 |
| 2017/0124170 A1* | 5/2017 | Koorapati | G06F 16/27 |
| 2017/0255417 A1* | 9/2017 | Dain | H04L 69/04 |
| 2018/0121101 A1* | 5/2018 | Thind | G06F 16/185 |
| 2018/0239556 A1* | 8/2018 | Cao | G06F 16/214 |
| 2019/0042595 A1* | 2/2019 | Basham | G06F 16/162 |
| 2019/0114086 A1* | 4/2019 | Andrew | G06F 3/0608 |
| 2020/0159391 A1* | 5/2020 | Kleinpeter | G06F 3/04842 |

* cited by examiner

DYNAMIC DATA MOVEMENT BETWEEN CLOUD AND ON-PREMISE STORAGES

RELATED APPLICATIONS

Benefit is claimed under 35 U.S.C. 119(a)-(d) to Foreign Application Serial No. 201741043855 filed in India entitled "DYNAMIC DATA MOVEMENT BETWEEN CLOUD AND ON-PREMISE STORAGES", on Dec. 7, 2017, by VMware, Inc., which is herein incorporated in its entirety by reference for all purposes.

BACKGROUND

An on-premise storage system is composed of an infrastructure of storage units connected to clients, typically by a local area network (LAN). "On-premise" storage systems usually serve clients that are part of the same organization. Storage systems, such as on-premise storage systems, may include a file system. A file system is a software service used to control how data is organized, stored, and retrieved within the storage system. Examples of file systems include Network File System (NFS) and Andrew file system (AFS).

Client storage requirements may grow beyond resources available in an on-premise storage system. However, the organization that controls the on-premise storage system might not wish to invest in additional storage units for the on-premise storage system. An alternative is to invest in cloud storage. In particular, an on-premise storage system may be combined with cloud-based storage to provide a "hybrid" integrated file-based file system that utilizes both on-premise and cloud-based storages. In a cloud storage system, data is typically stored in logical pools across multiple physical servers, and cloud storage may be exposed as a service over a wide area network (WAN), such as the Internet. Also, some cloud storage systems are "public" storage systems whose storage resources are shared by organizations that are separate from each other. Such public cloud storage systems are typically managed by an organization that is separate from the organization that controls an on-premise storage system.

Challenges arise in implementing a file system to manage allocation of files between on-premise and cloud storage systems in the hybrid integrated file-based file system described above. For example, data might need to be transferred from on-premise storage units to the cloud storage system when storage space in the on-premise storage units becomes constrained. In addition, data stored in the cloud storage system might need to be read, but reading files from the cloud requires transferring the files over a wide area network (WAN) such as the Internet, which can be latency intensive.

SUMMARY

One or more embodiments provide a method of managing a storage system that includes at least one on-premise storage unit. The method generally includes, for a first on-premise storage unit of the at least one on-premise storage unit: determining a utilization percentage of the first on-premise storage unit, comparing the utilization percentage of the first on-premise storage unit to a first threshold value, and, responsive to determining the utilization percentage of the first on-premise storage unit is greater than the first threshold value, serially transferring one or more files from the first on-premise storage unit to a cloud storage until the utilization percentage of the first on-premise storage unit decreases to a second threshold value.

Further embodiments include a non-transitory computer-readable storage medium storing instructions that, when executed by a computer system cause the computer system to perform the method set forth above, and a storage system which includes a file system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments presented herein provide techniques for transferring files to cloud storage so as to reduce usage of on-premise storage units, and for dynamically reading ahead from the cloud storage to improve read performance. In one embodiment, files are transferred from a storage unit in an on-premise storage system to cloud storage based on capacity remaining in the storage unit, access time, and file size. In such a case, each storage unit may be considered independently, and a decision made to move files from an on-premise storage unit to cloud storage when utilization of that storage unit reaches an associated mid-water-mark. In particular, files may be transferred beginning with least-recently accessed and smallest files and proceeding until the utilization percentage of the on-premise storage unit decreases to an associated low-water-mark. In addition, while files are being transferred to cloud storage, additional files may be written to the same on-premise storage unit until an associated high-water-mark is touched, at which point any further writes are redirected to the cloud storage until usage of the on-premise storage unit is reduced to the low-water-mark or more. To dynamically read ahead data from the cloud storage, one embodiment assumes that a user requesting a file from a given time may request other files from the same time period and transfers back from cloud storage to on-premise storage one or more files of the user that were created (or accessed) immediately before and/or after the user-requested file. Doing so may improve read performance if the other files are later read.

Figure 1:
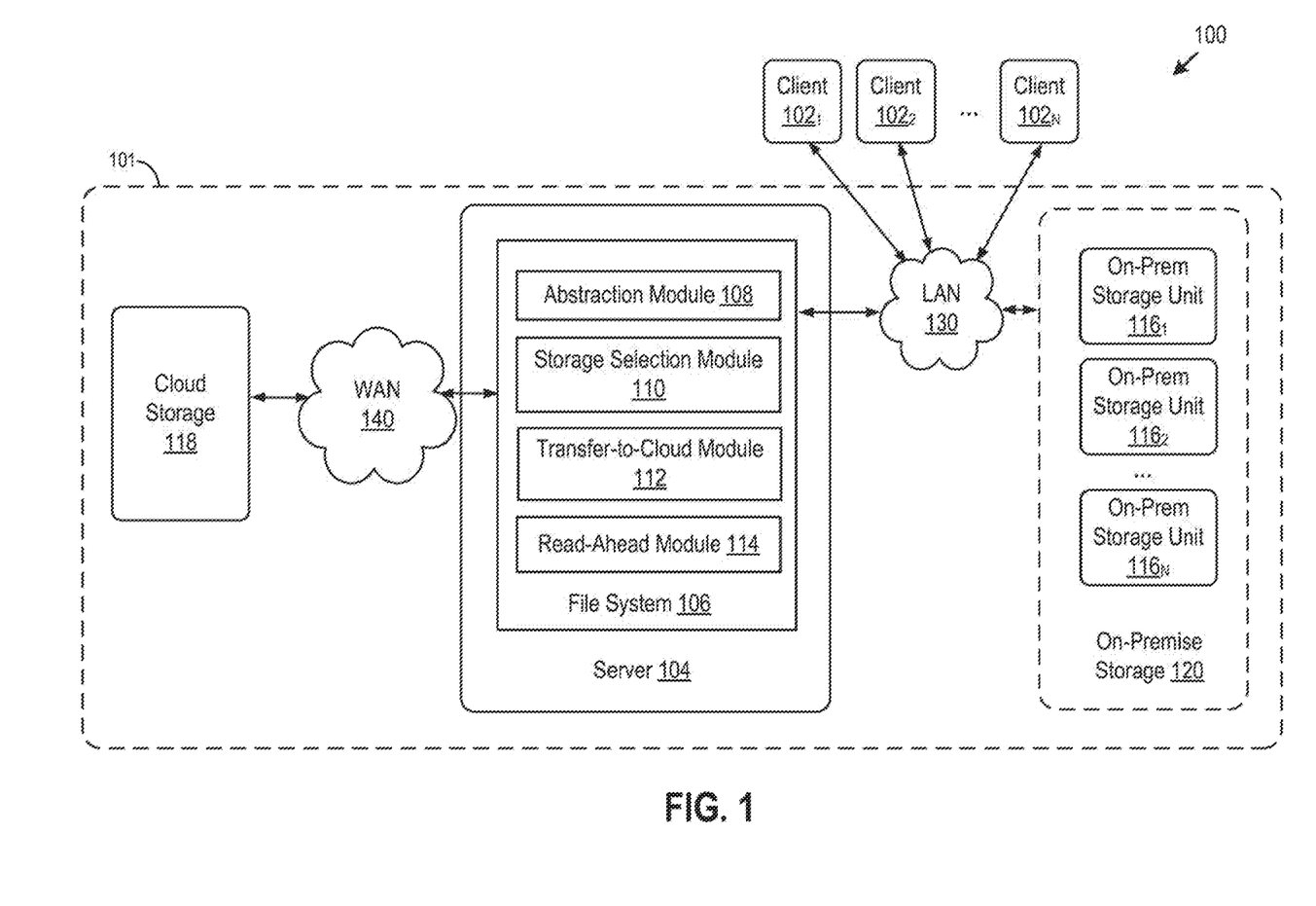
FIG. 1 is a block diagram illustrating a system in which one or more embodiments of the present disclosure may be utilized.

FIG. 1 is a block diagram illustrating a system 100 in which one or more embodiments of the present disclosure may be utilized. System 100 includes one or more clients $102_1$ to $102_n$ (collectively referred to as clients 102 and individually referred to as client 102), which communicate via a network, shown as local area network (LAN) 130, with a file system 106 of a storage system 101 in which clients 102 store data. Clients 102 may be any physical machines and/or virtual computing instances. A client 102 may be, for example, a laptop, a desktop computer, a mobile device, etc. Client 102 may also be a virtual machine or container running in a host computer, such that multiple clients 102 may be present on a single host computer or on separate host computers.

File system 106 controls how data is organized, stored, and retrieved within storage system 101. As shown, file system 106 runs in a server 104 on premise and communicates with on-premise storage 120 via LAN 130 and with cloud storage 118 via a wide area network (WAN) 140, such as the Internet. As described, clients 102 also connect to file system 106 through LAN 130. Although FIG. 1 depicts on-premise storage 120, file system 106, and clients 102 as being on the same on-premise LAN 130, it should be understood that different networks may also be used for communications. In another embodiment, file system 106 may be located in the cloud rather than on-premise.

File system 106 runs in server 104. Server 104 may be a physical machine or a virtual computing instance, such a VM or a container, running in a host computer. As shown, file system 106 includes abstraction module 108, storage selection module 110, transfer-to-cloud module 112, and read-ahead module 114, each of which is described further below.

File system 106 is a file based file system that works at the file level. In one embodiment, file system 106 is a software service that organizes, stores, and retrieves information to and from on-premise storage 120 and cloud storage 118. File system 106 maintains information on files within storage system 101. In particular, file system 106 stores file metadata such as file name, size, time of last access, and time of creation. "Time of creation" of a file, also referred to herein as a "file system creation timestamp," is the time when the file was first created in or otherwise became accessible to file system 106. For example, if a file was first created on a different system than storage system 101 and then sent to file system 106 by a client 102, then the "time of creation" or "file system creation timestamp" of that file will be the time when the file was first sent to file system 106 by the client 102.

As shown, file system 106 includes abstraction module 106, which presents the illusion of a single, unitary storage system to clients 102. When clients 102 interact with file system 106, abstraction module 108 hides individual on-premise storage units 116 and the presence of cloud storage 118. From the point of view of client 102, a single storage device stores all files of client 102. Abstraction module 106 also simplifies the client-side interface needed to interact with on-premise storage 120 and/or cloud storage 118. For example, each on-premise storage unit 116 may require a different protocol to access its storage. Examples of such protocols include SCSI, iSCSI, NFS, Fibre Channel (FC), and Fibre Channel over Ethernet (FCoE), and cloud storage 118 may also utilize its own separate protocol. Rather than requiring each client 102 to communicate in a number of different protocols used by on-premise storage units 116 and cloud storage 118, each client 102 may be configured to only communicate with file system 106 using a single protocol, and abstraction module 108 may translate between the protocol used by client 102 and protocol(s) of the target on-premise storage unit 116 or cloud storage 118.

On-premise storage 120 includes one or more on-premise storage units $116_1$ to $116_n$ (collectively referred to as on-premise storage units 116 and individually referred to as on-premise storage unit 116). Source storage units 116 may include any physical and/or logical data stores, such as one or more logical unit numbers (LUNs), logical pools, or other logical data stores exported from physical storage systems, storage area networks (SANs), network-attached storage (NASs), disk arrays, other network data storage systems, or some combination of these. On-premise storage units 116 are connected to file system 106 through a network, shown as LAN 130.

Similar to on-premise storage 120, cloud storage 118 may include its own storage unit(s) comprising physical and/or logical data stores that store data. Any suitable public or private cloud storage may be utilized, such as the commercially available Amazon Simple Storage Service (S3), Microsoft Azure®, or the like. Several distinct cloud storage solutions may be used, such as both Amazon Simple Storage Service (S3) and Microsoft Azure®, or only one such solution may be used. As shown, cloud storage 118 is connected to file system 106 through WAN 140, which may be the Internet.

In one embodiment, each on-premise storage unit 116 has an associated low-water-mark (LWM), mid-water-mark (MWM), and high-water-mark (HWM), which are threshold values representing levels or percentages of on-premise storage unit 116 utilization at which transferring or writing of data from an on-premise storage unit 116 to cloud storage 118 either starts or stops. As used herein, utilization "percentage" refers to the percentage of storage capacity that has been filled with data. For example, if the capacity of on-premise storage unit $116_1$ is 1000 GB, and on-premise storage unit $116_1$ holds 100 GB of data, then the utilization percentage of on-premise storage unit $116_1$ would be 10%. LWM represents a level or percentage of on-premise storage unit 116 utilization that is relatively low, such as for example, a 30% utilization. An exemplary range for potential LWM values is about 10% to 30% utilization. MWM represents a level of on-premise storage unit 116 utilization that is moderate, such as for example, 60%. An exemplary range for potential MWM values is about 40% to 60% utilization. When utilization of on-premise storage unit 116 reaches the associated MWM, transfer-to-cloud module 112, which may run continuously at the backend (e.g., as a daemon running in the background), begins transferring files from on-premise storage unit 116 to cloud storage 118, and such transferring of files continues until the utilization percentage of on-premise storage unit 116 decreases to its LWM.

Ideally, transferring files from on-premise storage unit 116 to cloud storage 118 when on-premise storage unit 116 reaches its MWM will prevent on-premise storage unit 116 from reaching its full capacity and producing a write fault when data is written to that on-premise storage unit 116. However, transferring files from on-premise storage unit 116 to cloud storage 118 may be slower than writing files from client 102 to on-premise storage unit 116, which may occur in parallel with the transferring of files from on-premise storage unit 116 to cloud storage 118. As a result of such parallel writing of data to on-premise storage unit 116, on-premise storage unit 116 may become full if data is being written to on-premise storage unit 116 faster than (other) data is transferred to cloud storage 118. In one embodiment, a third water mark, the high-water-mark (HWM), is used to prevent on-premise storage units 116 from becoming full. An exemplary range for potential HWM values is about 70% to 90% utilization. In such a case, when an associated HWM is reached for an on-premise storage unit 116, file system 106 stops writing to that on-premise storage unit 116 and instead writes directly to cloud storage 118, as further discussed below with reference to FIG. 3.

In some embodiments, the LWM, MWM, and HWM threshold values may be individualized and different for each on-premise storage unit 116. Or LWM, MWM, and HWM may be the same for all or some on-premise storage units 116. Non-limiting examples of LWM-MWM-HWM three-tuples include 10%-50-80%, 40%-60%-90%, and 30-60%-80%.

Storage selection module 110 is responsible for choosing a target on-premise storage unit 116 to which to write a file sent by client 102. That is, when client 102 writes a file to what client 102 perceives as a single, unitary storage unit, storage selection module 110 selects one of storage units 116 to actually write the file to. Storage selection module 110 may also redirect the writing of a file from on-premise storage unit 116 to cloud storage 118 under certain circumstances, as described further below with reference to FIG. 3.

Storage selection module 110 may use any suitable technique to balance data allocation among storage units. For example, storage selection module 110 may use well-known technique(s) such as the round robin technique, in which storage selection module 110 would cycle between on-premise storage units $116_1$ to $116_N$, storing a file or set of files on a given unit, and then moving on to the next on-premise storage unit 116 to store the next file or set of files, etc.

Transfer-to-cloud module 114 is responsible for transferring files from an on-premise storage unit 116 to cloud storage 118 when space on that on-premise storage unit 116 becomes limited, as dictated by associated MWM and HWM thresholds. In one embodiment, transfer-to-cloud module 114 considers each on-premise storage unit 116 independently from other on-premise storage units 116. In such a case, the available space on each on-premise storage unit 116 is considered individually to determine whether files need to be transferred from that on-premise storage unit 116 to cloud storage 118.

In one embodiment, to decide whether space needs to be freed on a given on-premise storage unit 116, transfer-to-cloud module 114 compares utilization percentage of that on-premise storage unit 116 to a mid-water-mark (MWM) associated with that on-premise storage unit 116. If the utilization percentage has reached the associated MWM, then transfer-to-cloud module 114 begins to move files from that on-premise storage unit 116 to cloud storage 118, as further discussed with reference to FIG. 2, below.

Figure 4:
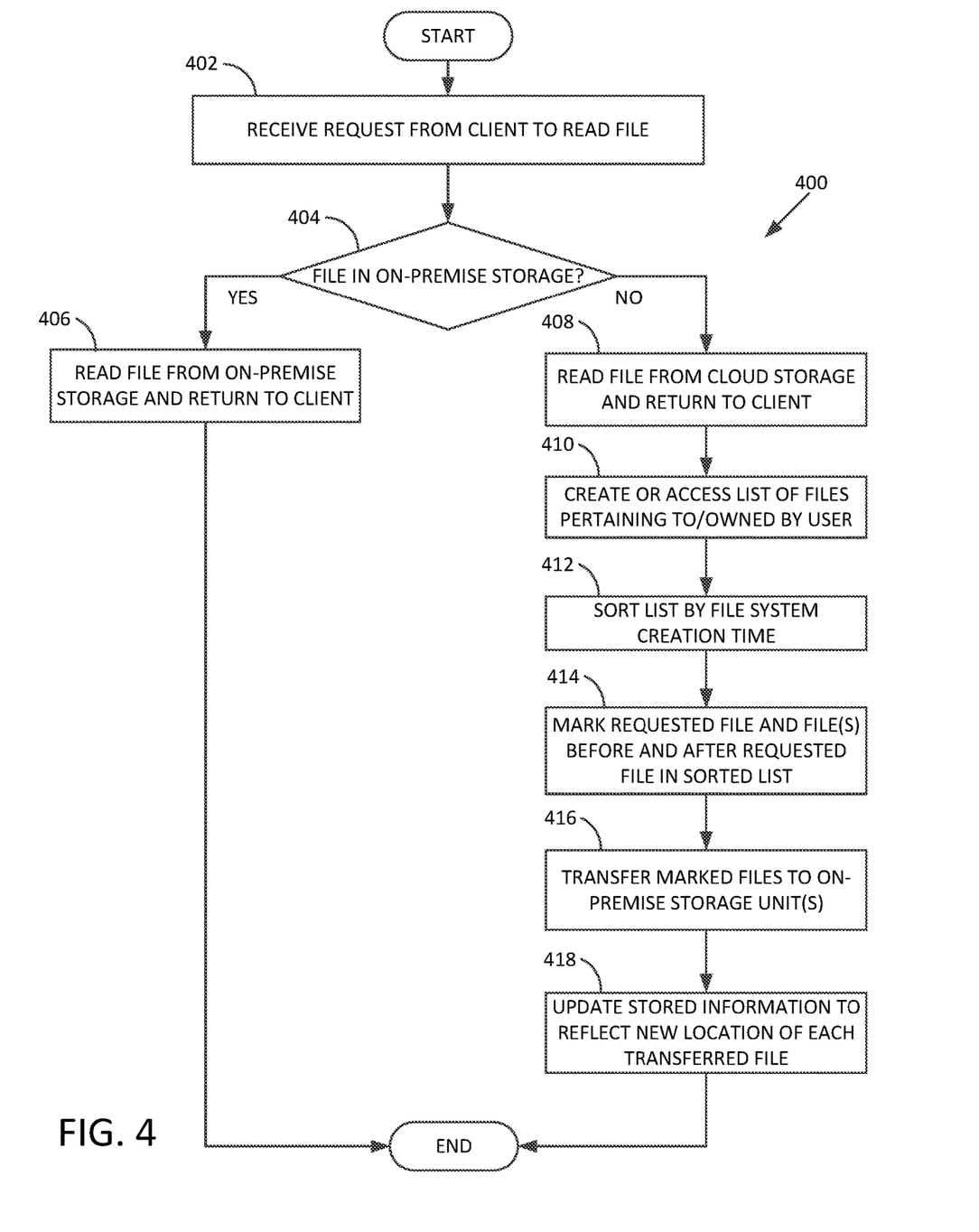
FIG. 4 is a flow diagram depicting a method of reading files from cloud storage, according to an embodiment.

Read-ahead module 114 is responsible for optimizing file retrieval from cloud storage 118. When client 102 reads a file that is stored in cloud storage 118 rather than in (one of the storage units 116 of) on-premise storage 120, read-ahead module 114 transfers that file from cloud storage 118 to on-premise storage 120, and also transfers other files that are determined to be likely to be accessed by client 102. Doing so may reduce read times by preparing the related files for quick access by client 102 via on-premise storage 120, rather than having to retrieve the related files from cloud storage 118 when those files are read. This is particularly the case if files being written to storage are similar in size such that nearly all on-premise storage units 116 become full and files are transferred to the cloud at nearly the same time, which is true for, e.g., archival (also referred to as "tier-3") data. Read-ahead module 114 is further described below with reference to FIGS. 4A and 4B.

Figure 2:
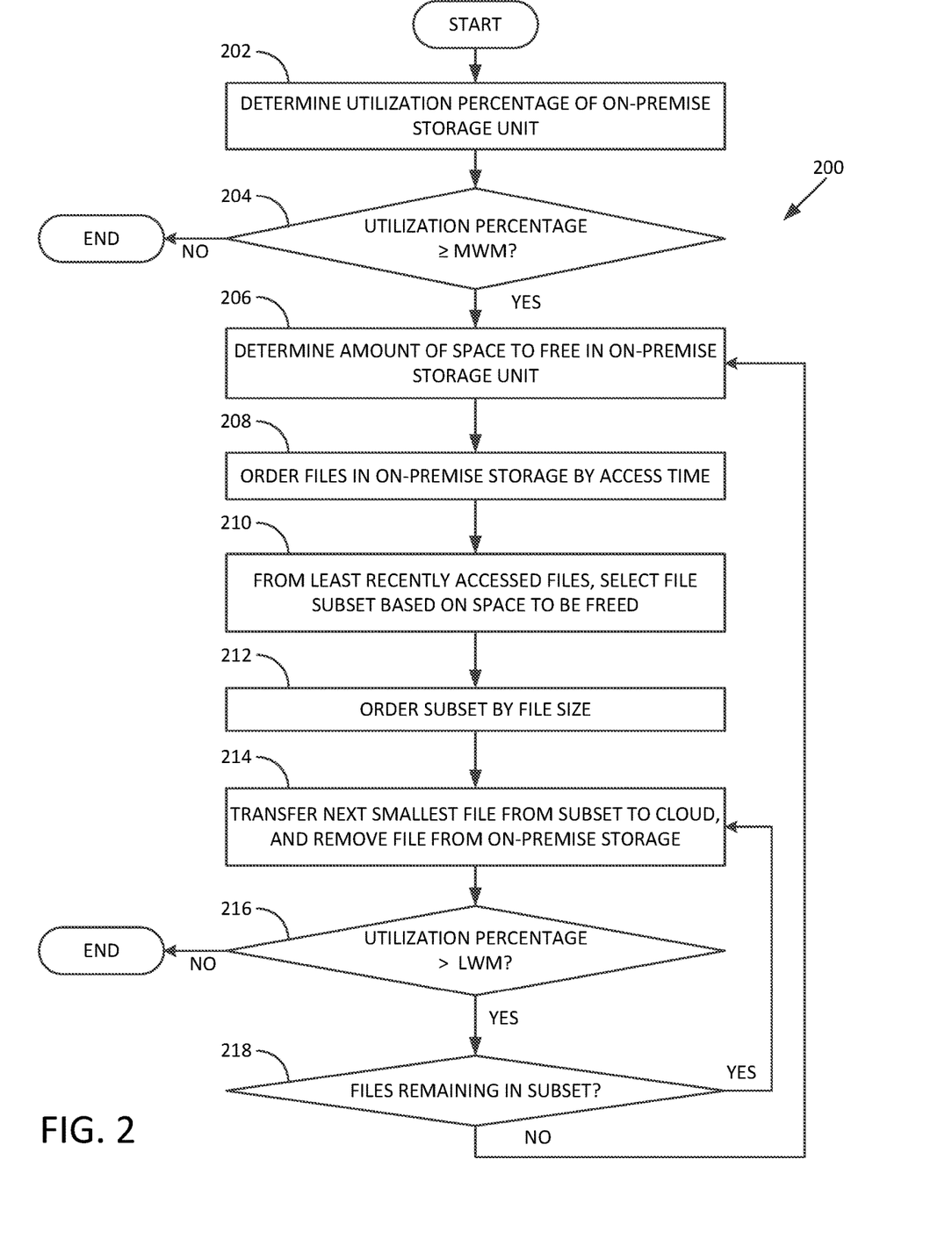
FIG. 2 is a flow diagram depicting a method of transferring files from an on-premise storage unit to cloud storage, according to an embodiment.

FIG. 2 is a flow diagram depicting a method 200 of transferring files from an on-premise storage unit 116 to cloud storage 118, according to an embodiment. Method 200 may be executed individually for each on-premise storage unit 116. On-premise storage unit $116_1$ will be used as an example in the following discussion of FIG. 2.

As shown, method 200 begins at step 202, where transfer-to-cloud module 112 determines a utilization percentage of on-premise storage unit $116_1$. In one embodiment, transfer-to-cloud module 112 executes method 200 once every designated period or interval of time for each of on-premise storage units 116. For example, method 200 may execute every five minutes for on-premise storage unit $116_1$, every five minutes for on-premise storage unit $116_2$, and so on for the rest of on-premise storage units 116. It should be understood that any suitable frequency of time may be used. For example, the frequency of execution of method 200 may be every 1 minute, 5 minutes, 10 minutes, 30 minutes, 1 hour, 5 hours, or 24 hours. If at the time of scheduled execution of method 200 for one of the on-premise storage units 116, a previous instance of method 200 is still executing for that on-premise storage unit 116, then a new instance method 200 may not be initiated. Rather, transfer-to-cloud module may attempt to execute method 200 again later, either after the first instance of execution has finished or after the designated interval of time has elapsed again.

At step 204, transfer-to-cloud module 112 compares the determined utilization percentage of on-premise storage unit $116_1$ with the MWM associated with on-premise storage unit $116_1$. The MWM value may be stored in a location accessible by file system 106, such as on server 104 and/or in on-premise storage unit $116_1$ itself. If the utilization percentage of on-premise storage unit $116_1$ is less than the MWM of on-premise storage unit $116_1$, then method 200 (transfer-to-cloud module 112) ends, as no files need to be transferred from on-premise storage unit $116_1$ to cloud storage 118. If the utilization percentage of on-premise storage unit $116_1$ is greater than or equal to the MWM of on-premise storage unit $116_1$, then method 200 continues to step 206, where transfer-to-cloud module 112 determines the amount of space that needs to be freed in on-premise storage unit $116_1$ to lower utilization of on-premise storage unit $116_1$ to the LWM associated with on-premise storage unit $116_1$. Continuing the example above in which the LWM, MWM, and HWM are 30%-60%-80%, if utilization of on-premise storage unit $116_1$ is at 65% of capacity, then transfer-to-cloud module 112 may determine that 35% of storage space should be freed to lower utilization of on-premise storage unit $116_1$ to the LWM of 30%. Although sometimes discussed herein with respect to utilization percentage being "less than" or "greater than," it should be understood that, in alternative embodiments, "less than or equal to" and "greater than or equal to" may be used in place of "less than" and "greater than," respectively, or the comparison may be approximate or involve a different comparison consistent with the teachings herein.

At step 208, transfer-to-cloud module 112 creates or accesses a list of files stored in on-premise storage unit $116_1$ and orders such a list by access (or use) time. That is, file system 106 orders a list of files from oldest access time to most recent access time, or vice versa. For example, if file 1 were last accessed one hour ago and file 2 were accessed two hours ago, then file 2 would be placed before file 1 in the ordered list.

At step 210, transfer-to-cloud module 112 selects a set of least recently accessed files in on-premise storage unit $116_1$ to transfer to cloud storage 118 and creates a new list or sublist including the selected files. For example, the least recently accessed files may be selected from the top (or bottom) of the list described above that was ordered by access time, with the combined size of the selected files being equal to or slightly greater than the amount of space that needs to be freed in on-premise storage unit $116_1$, as determined at step 206. For example, assume transfer-to-cloud module 112 needs to free 1 GB of space in on-premise storage unit $116_1$ to lower the utilization percentage of on-premise storage unit $116_1$ to the appropriate LWM. In such a case, if the six least recently used files in on-premise storage unit $116_1$ are, in order of least recently used to most recently used, file 1 of size 600 MB, file 2 of size 500 MB, file 3 of size 400 MB, file 4 of size 300 MB, file 5 of size 200 MB, and file 6 of size 100 MB, for a total size of 2.1 GBs, then transfer-to-cloud module 112 may select files 1 and 2 at step 210. The total size of files 1 and 2 is 1.1 GB, which is slightly larger than the 1 GB that needs to be cleared from on-premise storage unit $116_1$. However, as files 1 and 2 are relatively large, it may take a long time to transfer these files to cloud storage 118, and the transfer of large files may also fail. It would be preferable to transfer smaller files that are least recently used so as to free space in on-premise storage unit $116_1$ in quicker, more reliable increments. To accomplish this, in some embodiments, file system 106 may select a larger number of files than those necessary to clear the amount of space determined at step 206 (e.g., all of files 1 through 6), and then further select the smallest of such files to transfer until the LWM is reached, as discussed in greater detail below.

At step 212, transfer-to-cloud module 112 orders the selected subset from step 210 by file size. Then at step 214, transfer-to-cloud module 112 transfers the smallest file in the selected subset ordered by file size from on-premise storage unit $116_1$ to cloud storage 118. Upon successful transfer of a file, file system 106 removes the transferred file from on-premise storage unit $116_1$ and updates file system 106 to reflect the new file location.

At step 216, transfer-to-cloud module 112 obtains a new utilization percentage of on-premise storage unit $116_1$ and compares the new utilization percentage to the LWM associated with on-premise storage unit $116_1$. If the new utilization percentage is below the LWM, then the goal of lowering the amount of data stored in on-premise storage unit $116_1$ to the LWM has been reached, and method 200 ends thereafter.

If, on the other hand, the new utilization percentage is still above the LWM, then method 200 continues to step 218, where transfer-to-cloud module 116 checks whether there are more files in the set of files selected at step 210. If more files remain, then method 200 returns to step 214, where transfer-to-cloud module 116 transfers the next smallest file in the remaining files, as described above.

If, however, no files from the selected set of files remain, but on-premise storage unit $116_1$ is not below the LWM, then method 200 returns to step 206, where transfer-to-cloud module 116 again determines the amount of space that needs to be freed in on-premise storage unit $116_1$, etc. It should be understood that, despite calculating how many files need to be transferred at steps 206 to 212 in order to lower utilization percentage of on-premise storage unit $116_1$ below the LWM, and then transferring those files at steps 214 and 216, the utilization of on-premise storage unit $116_1$ may still be above the LWM as a result of files being written to on-premise storage unit $116_1$ at the same time according to method 300 of FIG. 3, discussed below. That is, as files are being transferred from on-premise storage unit $116_1$ to cloud storage 118 according to method 200, files may also be written to on-premise storage unit $116_1$ in parallel, requiring method 200 to repeat from step 206 to continue trying to lower utilization percentage of on-premise storage unit $116_1$ to below the LWM associated with on-premise storage unit $116_1$.

Figure 3:
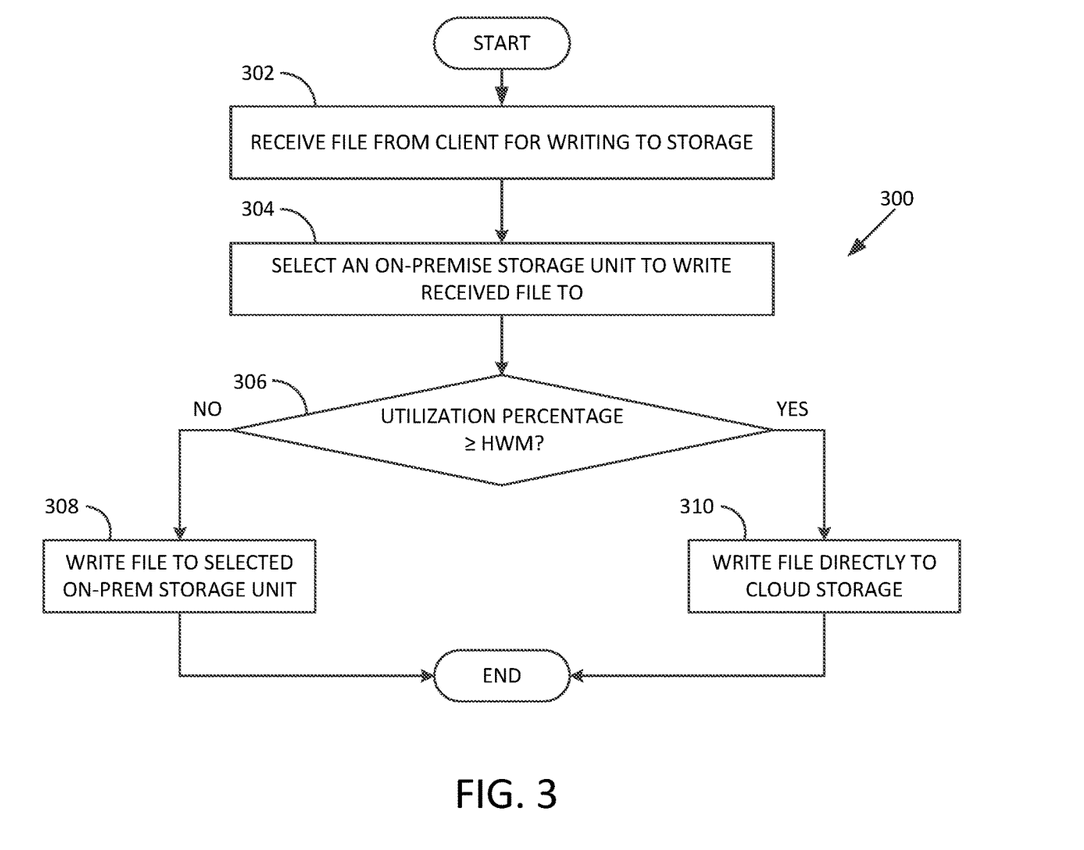
FIG. 3 is a flow diagram depicting a method of storing a received file in either on-premise storage or cloud storage, according to an embodiment.

FIG. 3 is a flow diagram depicting a method 300 of storing a received file in either on-premise storage 120 or cloud storage 118, according to an embodiment. Method 300 may execute in parallel with method 200 of FIG. 2, described above and with method 400 of FIG. 4, described below.

At step 302, file system 106 receives a file for writing from client 102. At step 304, storage selection module 110 in file system 106 selects one of on-premise storage units 116 to write the received file to. As described, the on-premise storage unit 116 may be selected using, for example, a round robin technique. For purposes of the discussion below, it will be assumed that storage selection module 110 selects on-premise storage unit $116_1$ to write the received file to.

At step 306, storage selection module 110 determines whether on-premise storage unit $116_1$, selected at step 304, has a utilization percentage that is greater than or equal to the HWM associated with on-premise storage unit $116_1$. If the utilization percentage of on-premise storage unit $116_1$ is not greater than or equal to (i.e., is less than) than the HWM, then, at step 308, file system 106 writes the file received at step 302 to on-premise storage unit $116_1$.

If, on the other hand, the utilization percentage of on-premise storage unit $116_1$ is greater than or equal to the HWM, then, at step 310, storage selection module 110 ignores the selection of on-premise storage unit $116_1$ made at step 304 and instead selects cloud storage 118 to write the file received at step 302 to. As described, if on-premise storage unit $116_1$ is at or above the associated HWM, then on-premise storage unit $116_1$ is close to reaching full capacity, at which point it may begin to return write faults to file system 106 and slow down the performance of storage system 101. In addition, the usual writing of received files to an on-premise storage unit (at step 310) may occur in parallel to and progress faster than the transferring of files to cloud data store 118 at steps 214 to 218 of method 200. As a result, the HWM associated with on-premise storage unit $116_1$ may be reached despite performing method 200 to attempt to lower the utilization percentage to the LWM of on-premise storage unit $116_1$. In such a case, method 300 redirects the writing of received files from being to on-premise storage unit $116_1$ to instead being to cloud storage 118.

FIG. 4 is a flow diagram depicting a method 400 of reading files from cloud storage 118, according to an embodiment. At step 402, file system 106 receives a request from client 102 to read a file. An example will be discussed in which client $102_1$ sends the file read request to file system 106, but it should be understood that a file read request may generally be sent by any client 102. At step 404, file system 106 determines whether the requested file is currently stored in one of on-premise storage units 116, or is instead stored in cloud storage 118. It should be understood that file system 106 may maintain data structure(s) including information on where files are stored, and file system 106 may then check such data structure(s) to determine whether the requested file is currently stored in one of on-premise storage units 116 or in cloud storage 118.

If the requested file is stored in one of on-premise storage units 116, then at step 406, file system 106 reads the requested file from the on-premise storage unit 116 in which the file is stored and returns the file to the requesting client $102_1$.

On the other hand, if the requested file is stored in cloud storage 118, then at step 408, file system 106 reads the requested file from cloud storage 118 and returns the file to the requesting client $102_1$. In addition, at step 410, read-ahead module 114 in file system 106 either creates, or accesses an existing, list of files pertaining to or owned by the same user of client $102_1$ that are stored in cloud storage 118. File system 106 then sorts such a list according to file system creation timestamp at step 412.

At step 414, file system 106 marks for transfer to on-premise storage unit(s) 116 at least one file before and/or at least one file after the requested file within the sorted listed created at step 412. The requested file itself is also marked. Any suitable number may be used for the number of files to mark. The more files are marked, the more files may be transferred to on-premise storage 120 along with the requested file, improving future access times to these related files that no longer need to be retrieved from cloud storage 118. File system 106 marks for transfer to on-premise storage 120 at least one file of the user that was created immediately before creation of the requested file and/or marks one file that was created immediately after creation of the requested file, as these files are predicted to be read along with the requested file. Here, "created immediately before" and "created immediately after" mean that the requested file is located adjacent to the requested file (in particular, before and after the requested file) within the sorted list of step 410. The number of files marked in addition to the requested file may be, for example, 1, 2, 4, 6, 10, 20, 100, 1000, or any other suitable number.

At step 416, file system 106 transfers or moves marked files from cloud storage 118 to on-premise storage 120. In particular, storage selection module 110 may select which on-premise storage unit to transfer each of the marked files to. As described, files that were sent to file system 106 for storage at around the same time as the requested file are predicted to be related and to be accessed together with the requested file. This is particularly the case if the sizes of written files are similar such that it can be assumed that nearly all on-premise storage units become full and files are transferred to the cloud at nearly the same time, which tends to be true for, e.g., archival data. By transferring files related by creation time to the requested file, future transfers of such files from cloud storage 118 to on-premise storage 120 may be avoided, thereby speeding up access times to those files.

After each marked file is successfully transferred to its target on-premise storage unit 116, that file is deleted from cloud storage 118, and file system 106 further updates stored information to reflect the new location of each transferred file at step 418.

Figure 5:
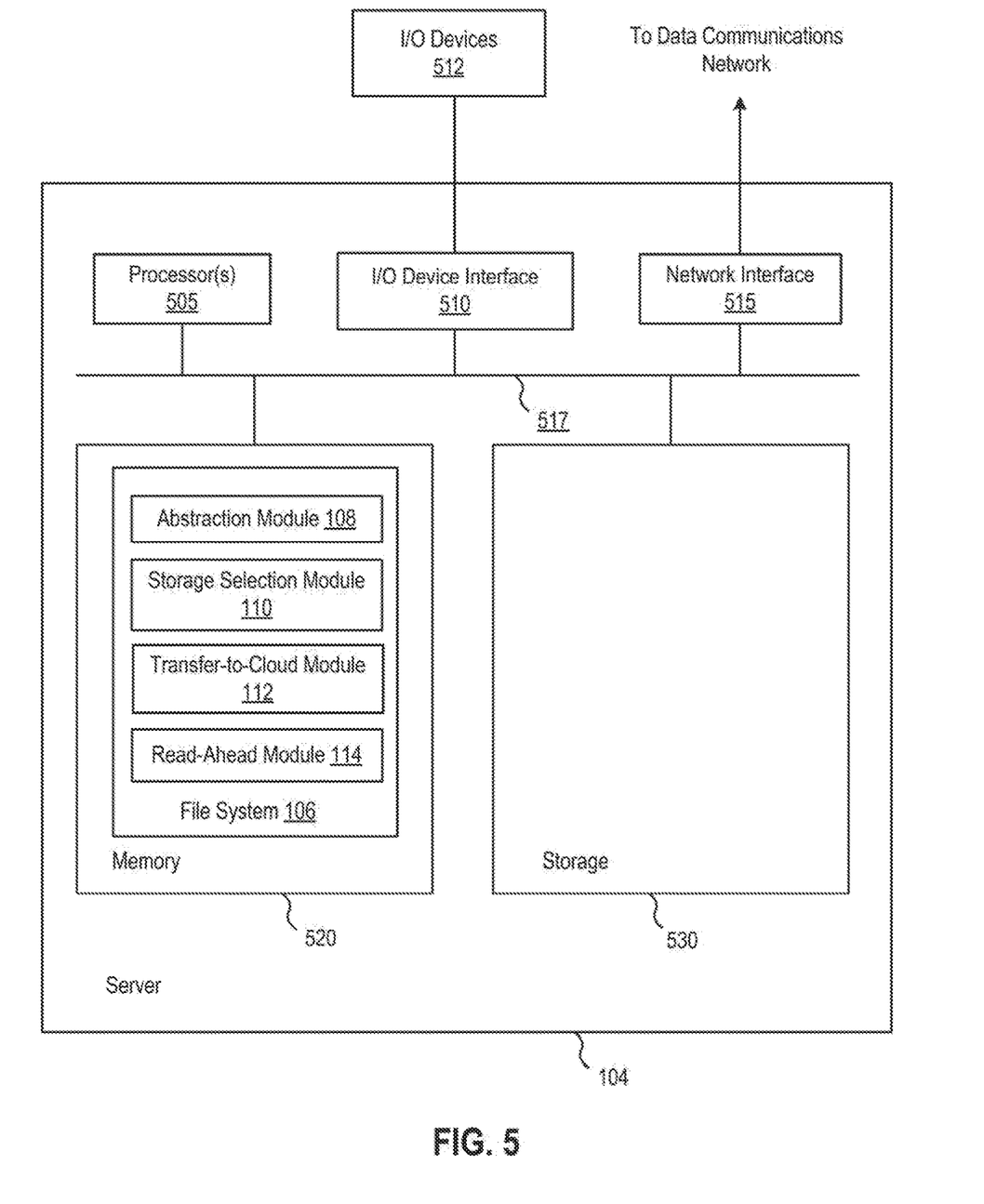
FIG. 5 depicts a block diagram of a server in which a file system may be implemented, according to an embodiment.

FIG. 5 depicts a block diagram of server 104 in which file system 106 may be implemented, according to an embodiment. As shown, server 104 includes, without limitation, processor(s) 505, a network interface 515 connecting the system to a network, an interconnect 517, a memory 520, and storage 530. Server 104 may also include an I/O device interface 510 connecting I/O devices 512 (e.g., keyboard, display and mouse devices) to server 104.

Processor(s) 505 generally retrieve and execute programming instructions stored in the memory 520. Similarly, processor(s) 505 may store and retrieve application data residing in the memory 520. Interconnect 517 facilitates transmission, such as of programming instructions and application data, between processor(s) 505, I/O device interface 510, storage 530, network interface 515, and memory 520. Processor(s) 505 are included to be representative of general purpose processor(s) and optional special purpose processors for processing video data, audio data, or other types of data. For example, processor(s) 505 may include a single central processing unit (CPU), multiple CPUs, a single CPU having multiple processing cores, one or more graphical processing units (GPUS), one or more field-programmable gate array (FPGA) cards, or a combination of these. And memory 520 is generally included to be representative of a random access memory. Storage 530 may be a disk drive storage device. Although shown as a single unit, storage 530 may be a combination of fixed or removable storage devices, such as magnetic disk drives, flash drives, removable memory cards or optical storage, network attached storage (NAS), or a storage area-network (SAN). Further, server 104 is included to be representative of a physical computing system as well as VM instance(s) hosted on a set of underlying physical computing systems. Further still, although shown as a single computing system, one of ordinary skill in the art will recognized that components of the server 104 shown in FIG. 5 may be distributed across multiple computing systems connected by a data communications network.

Illustratively, memory 520 includes file system 106, which itself includes abstraction module 108, storage selection module 110, transfer-to-cloud module 112, and read-ahead module 114. In one embodiment, file system 106 controls how data is organized, stored, and retrieved within storage system 101. Abstraction module 108 hides individual on-premise storage units so that a single, unitary storage system is presented to clients, and abstraction module 108 further translates between protocols used by clients and storage units/cloud storage. Storage selection module 110, transfer-to-cloud module 112, and read-ahead module 114 are configured to select on-premise storage units (or cloud storage) to store received data in, to transfer data from on-premise storage units to cloud storage 118 based on certain criteria, and to perform read-ahead by reading additional files related in time to a requested file from cloud storage 118, respectively. In one embodiment, transfer-to-cloud module 112 may determine a utilization percentage of an on-premise storage unit; compare the determined utilization percentage with a MWM associated with the on-premise storage unit; if the utilization percentage is greater than or equal to the MWM, determine the amount of space that needs to be freed in the on-premise storage unit to lower utilization to a LWM associated with the on-premise storage unit; create or access a list of files stored in on-premise storage unit and order such a list by least recently used (or accessed) time; select a set of least recently accessed files to transfer to cloud storage and order the selected set of least recently accessed files by file size; and repeatedly transfer the smallest not-yet-transferred file from the selected set ordered by file sized to cloud storage, until the determined amount of space has been freed (or all files in the selected list have been transferred, in which case additional files are selected for transfer), according to method 200 described above with respect to FIG. 2. In addition, file system 106 may receive a file for writing from client 102, select one of a number of on-premise storage units to write the received file to, determine whether the selected on-premise storage unit has a utilization percentage that is greater than or equal to an associated HWM, write the received file to the selected on-premise storage unit if the utilization percentage is less than the HWM, or write the received file to cloud storage if the utilization percentage is greater than or equal to the HWM, according to method 300 described above with respect to FIG. 3. Further, file system 106 may receive a request to read a file, determine whether the requested file is currently stored in an on-premise storage unit or in cloud storage, read the requested file from an on-premise storage unit in which the file is stored if the file is stored in an on-premise storage unit, and, if the file is stored in cloud storage, read the requested file as well as least one file before and/or at least one file created after the requested file from cloud storage, according to method 400 described above with respect to FIG. 4.

Advantageously, embodiments presented herein provide techniques for monitoring on-premise storages and transferring data to cloud storage when certain usage criteria are met, which help to prevent the on-premise storages from reaching full capacity and producing write faults. In addition, one embodiment employs a dynamic file read-ahead technique that reads from cloud storage one or more files pertaining to a user that are before and/or after a requested file in creation time. Doing so may reduce read times, as files with approximately the same creation time may be accessed by the user together.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A computer-implemented method of managing a storage system that includes a plurality of on-premise storage units, comprising:
   determining, by a server, a utilization percentage of each on-premise storage unit of the plurality of on-premise storage units, the server coupled to the plurality of on-premise storage units via a local area network (LAN);
   comparing, by the server, the utilization percentage of a first on-premise storage unit of the plurality of on-premise storage units to a first threshold value;
   responsive to determining the utilization percentage of the first on-premise storage unit is greater than the first threshold value, serially transferring, by the server, one or more files from the first on-premise storage unit to a cloud storage until the utilization percentage of the first on-premise storage unit decreases to a second threshold value; and
   responsive to receiving, from a client, a request to read a file that is stored in the cloud storage, transferring, from the cloud storage to the first on-premise storage unit, the file and at least one other file belonging to a same user, the at least one other file created within a file system at a time immediately before or after another time at which the file was created within the file system.

2. The method of claim 1, wherein:
   the first threshold value is between about 40% to 60% utilization of the first on-premise storage unit; and
   the second threshold value is between about 10% to 30% utilization of the first on-premise storage unit.

3. The method of claim 1 further comprising, responsive to receiving a request to write a file to the first on-premise storage unit:
   comparing the utilization percentage of the first on-premise storage unit to a third threshold value; and
   responsive to determining the utilization percentage of the first on-premise storage unit is greater than the third threshold value, writing the file to the cloud storage.

4. The method of claim 3, wherein the third threshold value is between about 70% to 90% utilization of the first on-premise storage unit.

5. The method of claim 3, further comprising, responsive to determining the utilization percentage of the first on-premise storage unit is not greater than the third threshold value, writing the file to the first on-premise storage unit.

6. The method of claim 1, wherein the client is coupled to the server and the plurality of on-premise storage units via the LAN.

7. The method of claim 1, wherein the file and the at least one other file are archival files.

8. The method of claim 1, further comprising, prior to transferring the file and the at least one other file, sorting files belonging to the user that are stored in the cloud storage according to file creation time within the file system.

9. The method of claim 1, further comprising, responsive to determining the utilization percentage of the first on-premise storage unit is equal to the first threshold value, serially transferring, by the server, one or more files from the first on-premise storage unit to the cloud storage until the utilization percentage of the first on-premise storage unit decreases to the second threshold value.

10. The method of claim 1, wherein the determining of the utilization percentage of each of the plurality of on-premise storage units occurs continuously at a predetermined interval of time.

11. A non-transitory computer-readable storage medium comprising instructions, which when executed by a computer system, causes the computer system to carry out operations for managing a storage system that includes a plurality of on-premise storage units, comprising:
   determining, by a server, a utilization percentage of each on-premise storage unit of the plurality of on-premise storage units, the server coupled to the plurality of on-premise storage units via a local area network (LAN);
   comparing, by the server, the utilization percentage of a first on-premise storage unit of the plurality of on-premise storage units to a first threshold value;
   responsive to determining the utilization percentage of the first on-premise storage unit is greater than the first threshold value, serially transferring, by the server, one or more files from the first on-premise storage unit to a cloud storage until the utilization percentage of the first on-premise storage unit decreases to a second threshold value; and
   responsive to receiving, from a client, a request to read a file that is stored in the cloud storage, transferring, from the cloud storage to the first on-premise storage unit, the file and at least one other file belonging to a same user, the at least one other file created within a file system at a time immediately before or after another time at which the file was created within the file system.

12. The computer-readable storage medium of claim 11, wherein:
   the first threshold value is between about 40% to 60% utilization of the first on-premise storage unit; and
   the second threshold value is between about 10% to 30% utilization of the first on-premise storage unit.

13. The computer-readable storage medium of claim 11, the operations further comprising, responsive to receiving a request to write a file to the first on-premise storage unit:
   comparing the utilization percentage of the first on-premise storage unit to a third threshold value; and
   responsive to determining the utilization percentage of the first on-premise storage unit is greater than the third threshold value, writing the file to the cloud storage.

14. The computer-readable storage medium of claim 13, wherein the third threshold value is between about 70% to 90% utilization of the first on-premise storage unit.

15. The computer-readable storage medium of claim 13, the operations further comprising,
   responsive to determining the utilization percentage of the first on-premise storage unit is not greater than the third threshold value, writing the file to the first on-premise storage unit.

16. The computer-readable storage medium of claim 11, wherein the client is coupled to the server and the plurality of on-premise storage units via the LAN.

17. The computer-readable storage medium of claim 11, the operations further comprising, prior to transferring the file and the at least one other file, sorting files belonging to the user that are stored in the cloud storage according to file creation time within the file system.

18. The computer-readable storage medium of claim 11, the operations further comprising, responsive to determining the utilization percentage of the first on-premise storage unit is equal to the first threshold value, serially transferring, by the server, one or more files from the first on-premise storage unit to the cloud storage until the utilization percentage of the first on-premise storage unit decreases to the second threshold value.

19. A storage system, comprising:
- a plurality of on-premise storage units;
- a cloud storage; and
- a file system on a server which, when executed on one or more processors, performs operations comprising:
    - determining, by the server, a utilization percentage of each on-premise storage unit of the plurality of on-premise storage units, the server coupled to the plurality of on-premise storage units via a local area network (LAN);
    - comparing, by the server, the utilization percentage of a first on-premise storage unit of the plurality of on-premise storage units to a first threshold value;
    - responsive to determining the utilization percentage of the first on-premise storage unit is greater than the first threshold value, serially transferring, by the server, one or more files from the first on-premise storage unit to the cloud storage until the utilization percentage of the first on-premise storage unit decreases to a second threshold value; and
    - responsive to receiving, from a client, a request to read a file that is stored in the cloud storage, transferring, from the cloud storage to the first on-premise storage unit, the file and at least one other file belonging to a same user, the at least one other file created within a file system at a time immediately before or after another time at which the file was created within the file system.

20. The method of claim 1, further comprising:
receiving, by the server, a first file for transfer to the first on-premise storage unit, the first file received from a client coupled to the server and the plurality of on-premise storage units via the LAN; and
responsive to determining the utilization percentage of the first on-premise storage unit is greater than the first threshold value:
- refraining from transferring the first file to the first on-premise storage unit; and
- serially transferring the first file to the cloud storage.

* * * * *